United States Patent
Bjork et al.

[15] 3,678,152
[45] July 18, 1972

[54] METHOD FOR THE X-RAY VISUALIZATION OF BODY CAVITIES AND A PREPARATION FOR CARRYING OUT THE METHOD

[72] Inventors: Lars Bjork, Dobelnsgatan 22D; Uno Eugen Erikson, Robertsuagen 8; Bjorn Gustov-Adolf Ingelman, Ovre Slottsgatan 1D, all of Uppsala, Sweden

[22] Filed: Oct. 6, 1969

[21] Appl. No.: 864,167

Related U.S. Application Data

[62] Division of Ser. No. 689,724, Dec. 11, 1967, abandoned.

[30] Foreign Application Priority Data

Dec. 13, 1966 Sweden..................................17053/66

[52] U.S. Cl..................................................424/5
[51] Int. Cl. ..............................................A61k 27/08
[58] Field of Search.............................424/5, 319

[56] References Cited

UNITED STATES PATENTS

| | | | |
|---|---|---|---|
| 3,178,473 | 4/1965 | Holterman et al. | 424/5 |
| 3,409,662 | 11/1968 | Larsen | 424/5 |

*Primary Examiner*—Sam Rosen
*Attorney*—F. C. Philpitt

[57] ABSTRACT

Compositions which comprise at least one iodine compound of the formula:

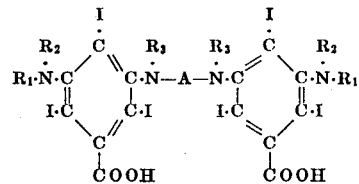

wherein $R_1$ is a lower alkyl group having no more than five carbon atoms and $R_2$ and $R_3$ are each a lower acyl group having no more than five carbon atoms and wherein A is an alkylene group substituted by at least one substituent of the formula $—OR_4$ wherein $R_4$ is a member selected from the group consisting of hydrogen, lower alkyl and lower acyl, said alkyl and acyl having each no more than five carbon atoms; said alkylene containing from three to 15 inclusive carbon atoms and optionally being broken by one or more oxygen bridges or a physiologically acceptable salt thereof. Such compositions are useful as X-ray contrast compositions and are administered to the body of the test object for the X-ray visualization of body cavities.

24 Claims, No Drawings

METHOD FOR THE X-RAY VISUALIZATION OF BODY CAVITIES AND A PREPARATION FOR CARRYING OUT THE METHOD

This application is a division of copending application, Ser. No. 689,724, filed Dec. 11, 1967, and now abandoned.

The present invention concerns a method for the visualization of body cavities and a preparation for carrying out the method.

The method according to the invention is mainly characterized in that there is administered to the body of the test object a preparation consisting of or comprising one or more iodine compounds having the formula:

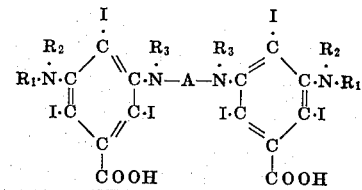

wherein $R_1$ is a lower alkyl, containing no more than five carbon atoms, and $R_2$ and $R_3$ are each a lower acyl group, containing no more than five carbon atoms and wherein A is an alkylene group substituted by one or more substituents of the formula $-Q-R_4$1 wherein $R_4$ is a hydrogen atom or a lower alkyl- or acyl group, said alkyl or acyl group having no more than five carbon atoms, said alkylene containing from three t 15 carbon atoms and being optionally broken by one or more oxygen bridges, or physiologically acceptable salts thereof.

According to a suitable embodiment of the invention the bridge

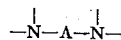

has each nitrogen thereof located at a distance of two carbon atoms from a group $-OR_4$. In this connection, preferably no more than one hetero atom is bound to one and the same carbon atom in the bridge A. The bridge A suitably contains three to 10 carbon atoms in the alkylene group.

Methyl and ethyl are examples of the substituent $R_1$. Acetyl and propionyl, for instance, may be considered as the substituents $R_2$ and $R_3$. As $R_4$ is preferably chosen a hydrogen atom when hydrophilic compounds are desired. When compounds having more lipophilic properties are desired there will be chosen as $R_4$ a lower alkyl such as methyl or ethyl or an acyl group such as acetyl or propionyl.

Examples of the bridge A in the above formulae are

or

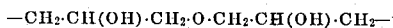

or

or

or

or

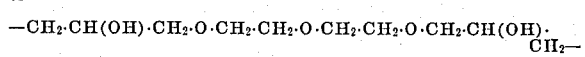

or

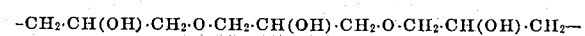

or any of the above bridges which have one or more hydroxyl groups alkylated or acylated with, respectively, a lower alkyl group, such as methyl or ethyl, or an acyl group, e.g., alkanoyl such as acetyl or propionyl having no more than five carbon atoms.

Examples of salts of the above compound are the sodium salt, methylglucamine salt, tris-hydroxymethylamino methane salt or other non-toxic salts. These can be used in the form of an aqueous solution.

As an example of valuable compounds can be mentioned:

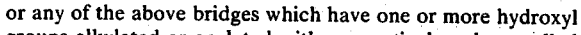
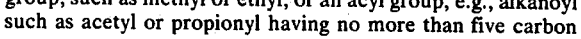

wherein A is

—$CH_2 \cdot CH(OH) \cdot CH_2 \cdot O \cdot (CH_2)_4 \cdot O \cdot CH_2 \cdot CH(OH) \cdot CH_2-$ or
—$CH_2 \cdot CH(OH) \cdot CH_2 \cdot O \cdot (CH_2)_2 \cdot O \cdot CH_2 \cdot CH(OH) \cdot CH_2-$ or
—$CH_2 \cdot CH(OH) \cdot CH_2 \cdot O \cdot CH_2 \cdot CH(OH) \cdot CH_2-$ or
—$CH_2 \cdot CH(OH) \cdot CH_2-$ or any of the above bridges which have one or more hydroxyl groups alkylated or acylated by, respectively, a lower alkyl group such as methyl or ethyl, or an acyl group such as acetyl or propionyl, said alkyl or acyl having no more than five carbon atoms, or physiologically acceptable salts thereof, e.g., the sodium salt or methyl glucamine salt.

A preparation for carrying out the method according to the invention may suitably consist of a mixture, such as an aqueous solution, or contain a physiologically acceptable solid carrier, the preparation being preferably in tablet form or in the form of any other suitable dosage unit; and the mixture containing one or more of the aforesaid compounds as active contrast-producing substances.

In applying the present method the contrast-producing agent is administered to the body of the test object after which the body is exposed to X-rays, photographic or direct observation on a fluorescent screen or some other conventional X-ray technics is carried out in the usual manner. The dosage of the contrast-producing agent is selected in accordance with the category of the case to be investigated so that a sufficient contrast effect is attained.

One example of the various body cavities which can be visibilized according to the invention is the gastro-intestinal tract. In this instance the contrast-producing agent is administered to the body perorally either as a solid or in solution. It is also possible to visibilize the intestines by introducing the contrast-producing agent rectally in the form of an enema. Another example is the visualization of blood vessels after injection of the contrast-producing agent in the form of a sterile solution. It is of particular value that subsequent to intravenious injection of the contrast-producing agent, the latter is excreted with the bile and makes possible the visualization of the bile ducts and gall bladder in an advantageous manner. Further examples are the use of the iodine compounds in hysterosalpingography, cholangiography, urethrography and sialography.

The novel iodine compounds used according to the invention have a low toxicity, e.g., when they are given intraveniously, and present excellent characteristics as X-ray contrast agents.

As carriers for the iodine compounds can be mentioned conventional additive substances, such as water with regard to injection solutions and extenders with regard to tablets.

If the preparation according to the invention is in the form of an aqueous solution the concentration of the iodine compound is chosen in accordance with the field of use. Preferably a content is chosen which exceeds 10 grams per 100 ml solution. However, generally a much higher content is chosen, e.g., in the order of 20, 30, 40 or 50 grams or more per 100 ml solution.

The aforesaid iodine compounds are produced by reacting compounds of the formula:

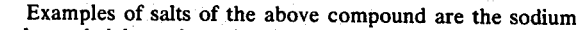
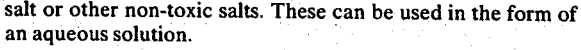

or salts thereof, wherein $R_1$, $R_2$ and $R_3$ each have the significance set forth above, with compounds of a formula Y·A·X., wherein A has the above significance, $R_4$ being preferably hydrogen, and wherein Y and X are each a halogen atom, preferably chloro or bromo, or with corresponding epoxide compounds obtainable from the compound Y·A·X by splitting off hydrogen halide. The obtained compound is either recovered as such or in the form of a physiologically acceptable salt.

Example of such salts are the sodium salt or methyl glucamine salt. Sodium salt and methyl glucamine salt dissolve well in water.

As examples of the bifunctional compounds of the type Y·A·X or a corresponding epoxide compound obtainable from the compound Y·A·X by splitting off hydrogen halide can be mentioned the following:

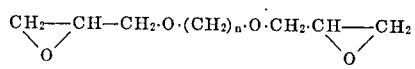

where $n$ is an integer from 2 to 4 inclusive and

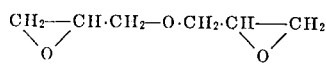

and

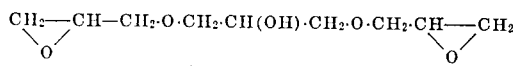

or corresponding halogen hydrins, and bifunctional glycerine derivatives of the formula X · $CH_2$ · CH(OH) · $CH_2$ — Y, e.g., dichlorohydrins and dibromohydrin, or corresponding epoxy compounds of the formula

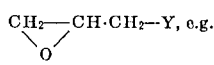

epichlorohydrin and epibromohydrin obtainable by splitting off hydrogen halide. Another example of such a bifunctional compound is 1.2–3.4-diepoxybutane.

The reaction is preferably carried out in a solvent, e.g., water or an aqueous liquid, and there is suitably added an alkaline reacting substance, e.g., alkali metal hydroxides, the alkaline reacting substance acting as a catalyst. The alkaline substances may also act as an acceptor for hydrogen halide if this substance is released in the reaction.

If it is desired to convert one or more hydroxyl groups in the bridge to alkylated or acylated hydroxyl groups, the obtained compounds are treated with, respectively, an alkylating agent or an acylating agent such as dimethyl sulphate or acetic anhydride in a common manner, in order to, respectively, alkylate or acylate hydroxyl groups.

The reaction can be carried out at different temperatures, for example, in range of 0° to 50° C. such as 20° C. and 40° C.

EXAMPLE 1.

0.1 mole of 3-acetylamino-5-acetyl-methylamino-2,4,6-triiodobenzoic acid was dissolved in 50 ml of an aqueous 4 N solution of sodium hydroxide. 0.05 mole of bis[2,3-epoxypropyl]ether was slowly added dropwise to the solution at 40° C. under agitation for 4 hours. The reaction mixture was then allowed to stand for 24 hours at 20° C., whereupon an aqueous 6 N solution of hydrogen chloride was added in an amount sufficient to precipitate the dicarboxylic acid formed during the reaction. The acid was cleansed by washing with water and repeated precipitations, and the acid finally dried under vacuum at 50° C. The yield of the dicarboxylic acid was about 60 grams.

Solutions may be prepared from the obtained acid by adding water and, e.g., equivalent amounts of sodium hydroxide or methyl glucamine.

EXAMPLE 2

0.1 mole of 3-acetylamino-5-acetyl-methylamino-2,4,6-triiodobenzoic acid was dissolved in 50 ml of an aqueous 4 N solution of sodium hydroxide. 0.05 mole of 1,2-ethanediol-diglycide ether was slowly added to the solution dropwise at 40° C. under agitation for 4 hours. The reaction mixture was then allowed to stand for 24 hours at 20° C., whereupon an aqueous 6 N solution of hydrogen chloride was added in an amount sufficient to precipitate the dicarboxylic acid formed in the reaction. The acid was cleansed by washing with water and repeated precipitations were effected and said acid dried under vacuum at 50° C. The yield of dicarboxylic acid was about 60 grams.

Solutions can be prepared from obtained acid bY adding water and, e.g., equivalent amounts of sodium hydroxide or methyl glucamine.

EXAMPLE 3

0.1 mole of 3-acetylamino-5-acetyl-methylamino-2,4,6-triiodobenzoic acid was dissolved in 50 ml of an aqueous 4 N solution of sodiumhydroxide. 0.05 mole of 1,4-butane-diol-diglycide ether was slowly added to the mixture dropwise at 40° C. under agitation for 4 hours. The reaction mixture was then allowed to stand for 24 hours at 20° C., whereupon an aqueous 6 N solution of hydrogen chloride was added in an amount sufficient to precipitate the dicarboxylic acid formed in the reaction. The acid was cleansed by washing and repeated precipitations, and said acid dried under vacuum at 50° C. The yield of dicarboxylic acid was about 60 grams.

The obtained acid can be transferred into salts, from which aqueous solutions can be prepared as in Example 1 and Example 2.

EXAMPLE 4

In a similar manner to that of Example 1, 0.1 mole of 3-acetylamino-5-acetyl-methylamino-2,4,6-triiodobenzoic acid was reacted with 0.05 mole of epichlorohydrin or with 0.05 mole of epibromohydrin or with 0.05 mole of dichlorohydrin.

Cleansing of the dicarboxylic acid formed in the reaction carried out in a manner similar to that of Example 1.

EXAMPLE 5

Solutions were prepared from each of the dicarboxylic acids obtained in examples 1, 2, 3 and 4, in the following manner:

35 grams of substance and equivalent amounts of methyl glucamine were dissolved in water to a solution volume of 100 ml. pH was adjusted to 7.3–7.4. The solution was filtered and poured into bottles, which were sealed and sterilized in an autoclave.

EXAMPLE 6

The solutions from Example 5 were injected in the blood vessels of rabbits, whereupon the blood vessels were made visable by X-rays and photographs.

After a while, e.g., after 30 minutes, 1 hour and 2 hours, X-ray exposure and photographing of the gastro-area showed a good contrast filling of the gall bladder and bile ducts.

EXAMPLE 7

Solutions from Example 5 were administered orally to rabbits, whereafter the gastro-intestinal tract were made visable by X-rays and photographs, with excellent results.

EXAMPLE 8

Solutions of sodium salt of the compounds prepared in a manner similar to that of Example 5 containing 20 grams of dicarboxylic acids per 100 ml solution were administered in the form of an enema to rabbits, whereupon the intestines could be observed by X-rays and photographs, with good results.

What we claim is:

1. A method for the X-ray visualization of body cavities, which comprises administering to the body of the test object a preparation containing a member selected from the group consisting of (A) iodine compounds of the formula:

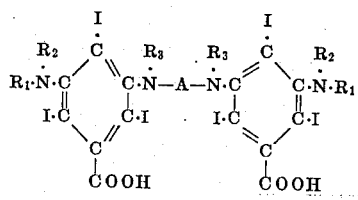

wherein $R_1$ is a lower alkyl group having no more than 5 carbon atoms and $R_2$ and $R_3$ are each a lower alkanoyl group having no more than five carbon atoms and wherein A is an alkylene group substituted by at least one substituent of the formula $-OR_4$ wherein $R_4$ is a member selected from the group consisting of hydrogen, lower alkyl and lower alkanoyl, said alkyl and alkanoyl having each no more than five carbon atoms; said alkylene containing from three to 15 inclusive carbon atoms, and (B) physiologically acceptable salts thereof; and wherein said member is present in an effective contrast producing amount.

2. The method of claim 1 wherein said iodine compound has each nitrogen atom in the bridge

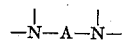

thereof located at a distance of two carbon atoms from a group $-OR_4$ and that no more than one oxygen is bound to one and the same carbon atom in the bridge A.

3. The method of claim 1 wherein the bridge A of the iodine compound is $-CH_2 \cdot CH(OR_4) \cdot CH_2$.

4. The method of claim 3 wherein $R_1$ is methyl, $R_2$ and $R_3$ are acetyl and $R_4$ is hydrogen.

5. The method of claim 1 wherein $R_1$ is a member selected from the group consisting of methyl and ethyl and $R_2$ and $R_3$ are each a member selected from the group consisting of acetyl and propionyl and $R_4$ is a member selected from the group consisting of hydrogen, methyl, ethyl, acetyl, and propionyl.

6. The method of claim 1 wherein the iodine compound is administered to the body of the test object in the form of a non-toxic salt in an aqueous solution.

7. The method of claim 1 wherein the iodine compound is administered to the body of the test object in solid form.

8. A method for the X-ray visualization of body cavities, which comprises administering to the body of the test object a preparation containing a member selected from the group consisting of (A) iodine compounds of the formula:

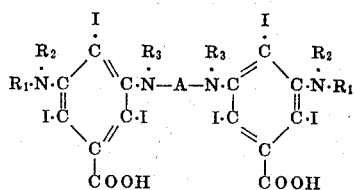

wherein $R_1$ is a lower alkyl group having no more than five carbon atoms and $R_2$ and $R_3$ are each a lower alkanoyl group having no more than five carbon atoms and wherein A is an alkylene group substituted by at least one substituent of the formula $-OR_4$, wherein $R_4$ is a member selected from the group consisting of hydrogen, lower alkyl and lower alkanoyl said alkyl and alkanoyl groups containing each no more than five carbon atoms; said alkylene containing from three to 15 inclusive carbon atoms and being broken by at least one oxygen atom, and (B) physiologically acceptable salts thereof, and wherein said member is present in an effective contrast producing amount.

9. The method of claim 8 wherein the iodine compound has each nitrogen atom in the bridge

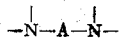

thereof located at a distance of two carbon atoms from a group $-OR_4$ and that no more than one oxygen is bound to one and the same carbon atom in the bridge A.

10. The method of claim 8 wherein the bridge A of the iodine compound is a member selected from the group consisting of
$-CH_2 \cdot CH(OH) \cdot CH_2 \cdot O \cdot (CH_2)_4 \cdot O \cdot CH_2 \cdot CH(OH) \cdot CH_2-$ and
$-CH_2 \cdot CH(OH) \cdot CH_2 \cdot O \cdot (CH_2)_2 \cdot O \cdot CH_2 \cdot CH(OH) \cdot CH_2-$ and
$-CH_2 \cdot CH(OH) \cdot CH_2 \cdot O \cdot CH_2 \cdot CH(OH) \cdot CH_2-$ and
$-CH_2 \cdot CH(OH) \cdot CH_2 \cdot O \cdot CH_2 \cdot CH(OH) \cdot CH_2 \cdot O \cdot CH_2 \cdot CH(OH) \cdot CH_2-$ and
bridges of these formulas having at least one hydrogen atom of the hydroxyl groups replaced by a member selected from the group consisting of lower alkyl and lower alkanoyl, said alkyl and alkanoyl containing each no more than five carbon atoms.

11. The method of claim 10 wherein $R_1$ is methyl, and $R_2$ and $R_3$ are each acetyl.

12. The method of claim 8 wherein $R_1$ is a member selected from the group consisting of methyl and ethyl and $R_2$ and $R_3$ are each a member selected from the group consisting of acetyl and propionyl and $R_4$ is a member selected from the group consisting of hydrogen, methyl, ethyl, acetyl and propionyl.

13. The method of claim 8 wherein the iodine compound is administered to the body of the test object in the form of a non-toxic salt in an aqueous solution.

14. The method of claim 8 wherein the iodine compound is administered to the body of the test object in solid form.

15. A preparation for the administration to the body of a test object in connection with the X-ray visualization of body cavities, consisting of an aqueous solution comprising at least one iodine compound soluble in water and being a member selected from the group consisting of (A) iodine compounds of the formula:

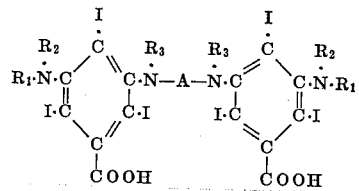

wherein $R_1$ is a lower alkyl group having no more than five carbon atoms and $R_2$ and $R_3$ are each a lower alkanoyl group having no more than five carbon atoms and wherein A is a member selected from the group of an alkylene group containing from three to 15 inclusive carbon atoms and substituted by at least one substituent of the formula $-OR_4$ and an alkylene group containing from three to 15 inclusive carbon atoms being broken by at least one oxygen atom and substituted by at least one substituent of the formula $-OR_4$; wherein $R_4$ is a member selected from the group consisting of hydrogen, lower alkyl and lower alkanoyl, said alkyl and alkanoyl having each no more than five carbon atoms; and (B) physiologically acceptable salts thereof; in an effective contrast producing amount.

16. The preparation of claim 15 wherein A is an alkylene group broken by at least one oxygen atom.

17. The preparation of claim 15 wherein A is an alkylene group containing from three to 15 inclusive carbon atoms substituted by at least one substituent of the formula $-OR_4$.

18. The preparation of claim 16 wherein said at least one iodine compound is present in an amount exceeding 10 grams per 100 ml. of solution.

19. The preparation of claim 17 wherein said at least one iodine compound is present in an amount exceeding 10 grams per 100 ml. of solution.

20. The preparation of claim 17 wherein the bridge A of the iodine compound is $-CH_2 \cdot CH(OR_4) \cdot CH_2$, $R_1$ is a member selected from the group consisting of methyl and ethyl and $R_2$ and $R_3$ are each a member selected from the group consisting of acetyl and propionyl and $R_4$ is a member selected from the group consisting of hydrogen, methyl, ethyl, acetyl and propionyl.

21. The preparation of claim 16 wherein the bridge A of the iodine compound is a member selected from the group consisting of
—CH$_2$·CH(OH)·CH$_2$·O·(CH$_2$)$_4$·O·CH$_2$·CH(OH)·CH$_2$— and
—CH$_2$·CH(OH)·CH$_2$·O·(CH$_2$)$_2$·O·CH$_2$·CH(OH)·CH$_2$— and
—CH$_2$·CH(OH)·CH$_2$·O·CH$_2$·CH(OH)·CH$_2$— and
—CH$_2$·CH(OH)·CH$_2$·O·CH$_2$·CH(OH)·CH$_2$·O·CH$_2$·CH(OH)·CH$_2$— and
bridges of these formulas hAving at least one hydrogen atom of the hydroxyl groups replaced by a member selected from the group consisting of lower alkyl and lower alkanoyl, said alkyl and alkanoyl containing each no more than five carbon atoms, $R_1$ is a member selected from the group consisting of methyl and ethyl and $R_2$ and $R_3$ are each a member selected from the group consisting of acetyl and propionyl.

22. A preparation for the administration to the body of a test object in connection with the X-ray visualization of body cavities, consisting of a solid mixture comprising at least one iodine compound selected from the group consisting of (A) iodine compounds of the formula:

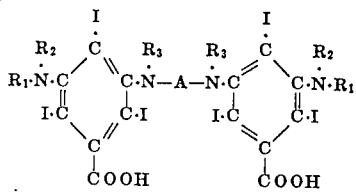

wherein $R_1$ is a lower alkyl group having no more than five carbon atoms and $R_2$ and $R_2$ are each a lower alkanoyl group having no more than five carbon atoms and wherein A is a member selected from the group of an alkylene group containing from three to 15 inclusive carbon atoms and substituted by at least one substituent of the formula —OR$_4$ and an alkylene group containing from three to 15 inclusive carbon atoms, being broken by at least one oxygen atom and substituted by at least one substituent of the formula —OR$_4$; wherein $R_4$ is a member selected from the group consisting of hydrogen, lower alkyl and lower alkanoyl, said alkyl and alkanoyl having each no more than five carbon atoms; and (B) physiologically acceptable salts thereof; in an effective contrast producing amount.

23. The preparation of claim 22 wherein A is an alkylene group broken by at least one oxygen atom.

24. The preparation of claim 22 wherein A is an alkylene group containing from three to 15 inclusive carbon atoms substituted by at least one substituent of the formula —OR$_4$.

* * * * *